United States Patent [19]

Sircar et al.

[11] 4,249,915
[45] Feb. 10, 1981

[54] REMOVAL OF WATER AND CARBON DIOXIDE FROM AIR

[75] Inventors: Shivaji Sircar, Allentown; Wilbur C. Kratz, Macungie, both of Pa.

[73] Assignee: Air Products and Chemicals, Inc., Allentown, Pa.

[21] Appl. No.: 43,770

[22] Filed: May 30, 1979

[51] Int. Cl.³ .............................. B01D 53/04
[52] U.S. Cl. ........................... 55/26; 55/33; 55/58; 55/62; 55/74; 55/75; 62/18
[58] Field of Search ................... 55/25, 26, 33, 58, 62, 55/68, 74, 75; 62/18

[56] References Cited

U.S. PATENT DOCUMENTS

| | | | |
|---|---|---|---|
| 2,968,160 | 1/1961 | Schilling et al. | 62/18 X |
| 3,140,931 | 7/1964 | McRobbie | 55/58 X |
| 3,176,444 | 4/1965 | Kiyonaga | 55/58 X |
| 3,221,477 | 12/1965 | Arnoldi et al. | 55/33 X |
| 3,225,516 | 12/1965 | Smith et al. | 55/58 X |
| 3,242,651 | 3/1966 | Arnoldi | 55/33 X |
| 3,533,221 | 10/1970 | Tamura | 55/33 |
| 3,594,983 | 7/1971 | Yearout | 55/58 X |
| 3,738,084 | 6/1973 | Simonet et al. | 55/62 X |
| 3,796,022 | 3/1974 | Simonet et al. | 55/33 X |
| 3,841,058 | 10/1974 | Templeman | 55/33 |
| 4,013,429 | 3/1977 | Sircar et al. | 55/33 |
| 4,030,896 | 6/1977 | Wimber et al. | 55/33 |
| 4,042,349 | 8/1977 | Baudouin et al. | 55/25 |
| 4,153,428 | 5/1979 | Saunders et al. | 55/33 X |

*Primary Examiner*—Robert H. Spitzer
*Attorney, Agent, or Firm*—E. Eugene Innis; Ronald B. Sherer

[57] ABSTRACT

Moisture and $CO_2$ are removed from atmospheric air by adsorption of these respectively in separate beds. The moisture laden bed is regenerated by pressure swing adsorption in a relatively short operating cycle while the $CO_2$-laden bed is regenerated thermally at considerably longer time intervals. The described method is of particular advantage in connection with the pretreatment of air prior to cryogenic distillation for separation of oxygen and nitrogen therein.

14 Claims, 1 Drawing Figure

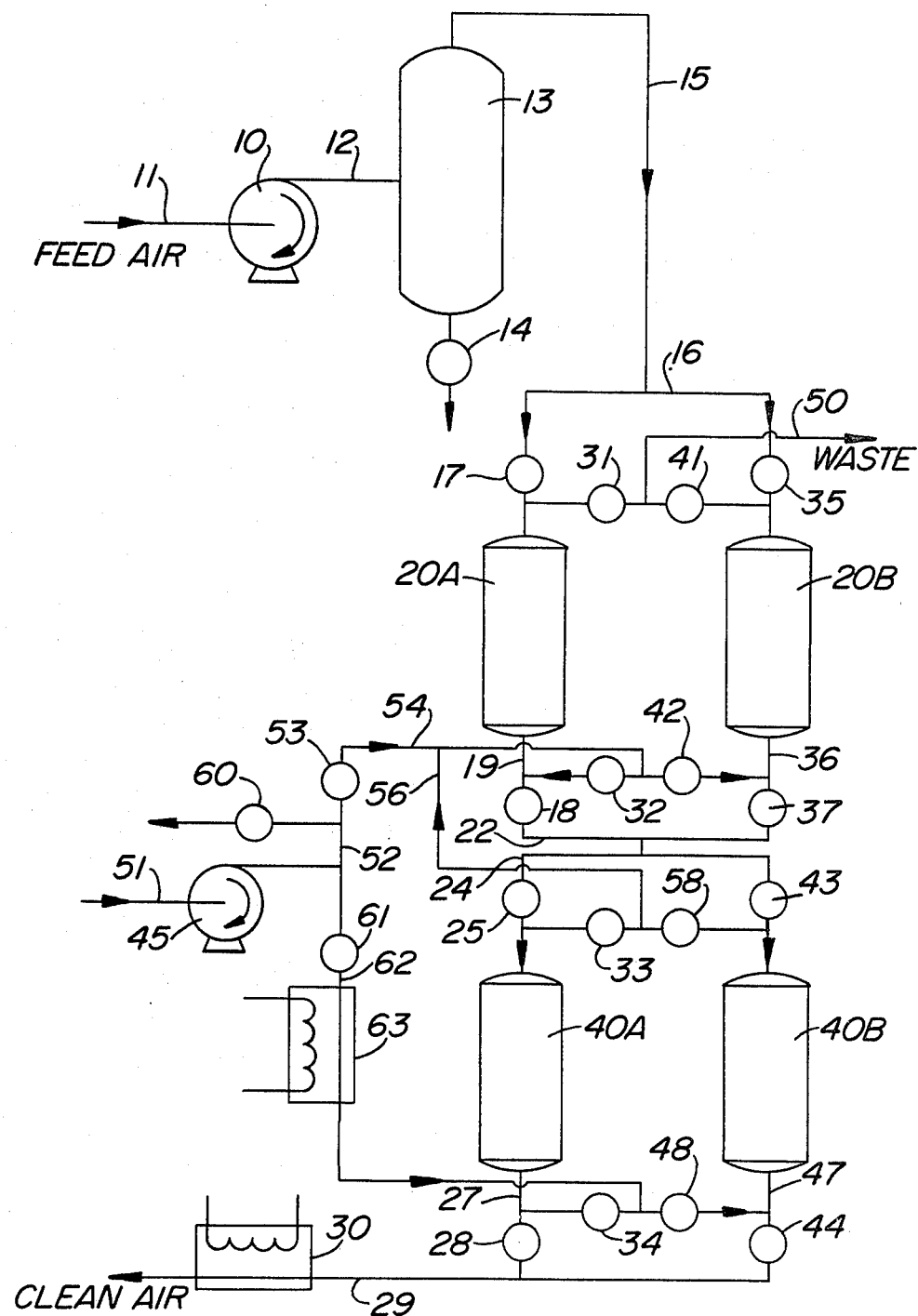

REMOVAL OF WATER AND CARBON DIOXIDE FROM AIR

BACKGROUND OF THE INVENTION

1. Field of the Invention

The present invention relates to the removal of water and $CO_2$ from atmospheric air and is particularly concerned with the removal of these components from air to be employed as feed gas to a cryogenic air separation plant.

2. Prior Art

In the conventional process for cryogenic separation of air to recover nitrogen and oxygen, the feed air is compressed, then cooled to low temperature before introduction to a two stage distillation column. Unless water and $CO_2$ are removed from the air after compression, these components will block the heat exchangers employed for cooling the gas prior to its distillation. The two principal methods for such removal are thermal swing adsorption (TSA) on molecular sieve, or controlled freeze out in reversing heat exchangers. Each of these systems presents its own advantages and disadvantages over the other from the standpoint of operation efficiency and economics. In most instances, reversing exchangers have been usually preferred unless it was required to obtain high nitrogen recovery which is better achieved by the thermal swing adsorption system. Such pretreatment of air prior to cryogenic separation is disclosed, for example, in U.S. Pat. Nos. 2,968,160 and 4,030,896.

In a typical prior art system employing molecular sieve or other solid sorbent for removal of water and $CO_2$ from feed air, atmospheric air is compressed to about 100 psia (~7 bars) followed by water cooling, and removal of the thus condensed water. Then the air, which is then at about 100° F. (~38° C.), is further cooled to 40° F. (~4–5° C.) using refrigerated ethylene glycol. The bulk of the water is removed in this step by condensation and separation of the condensate. The gas is then passed to a molecular sieve bed system where the remaining water and $CO_2$ are removed by adsorption. The sorbent beds are operated by the thermal swing mode with equal periods, such as four hours, being devoted to adsorption and to regeneration. In other systems, the time period for heating is shorter than that for subsequent cooling (U.S. Pat. No. 4,030,896). By using two beds, one is operated on adsorption while the other is being regenerated and their roles are periodically reversed in the operating cycle. During the regeneration, part of the product gas (nitrogen) is slightly compressed with a blower and then initially heated to say about 500° F. (260° C.). The hot gas is passed through the bed then being regenerated, say for two hours, following which the regeneration gas is cooled to say 40° F. (4°–5° C.) for the final two hours for cooling the bed to that temperature. Regeneration is carried out in a direction counter to that of the adsorption step.

Pre-treatment of air for removal of water and $CO_2$ is also known in connection with adsorptive systems for separation of oxygen and nitrogen therein. The preliminary removal of the water and $CO_2$ may be carried out in a single column containing a single bed of adsorbent, or such column containing separate layers of adsorbents selective respectively for water and $CO_2$. It has also been suggested to employ separated beds for removal of water and $CO_2$ respectively from the feed air.

In systems wherein the pretreatment section for water and $CO_2$ removal is employed in association with an adsorptive air separation section operating in the pressure swing adsorption (PSA) mode for regeneration of the main adsorber columns therein, the pretreatment section may also be operated in the pressure swing mode as in U.S. Pat. Nos. 3,796,022; 4,013,429; and 4,042,349. It has also been proposed to operate the pretreater section by periodic thermal regeneration, while the $N_2$—$O_2$ separation section is operated in the pressure swing model; U.S. Pat. Nos. 3,140,931; and 3,533,221.

The removal of water and $CO_2$ from atmospheric air is not limited to situations in which the purified air is to be employed as feed to a cryogenic air separation plant, or as feed to a selective adsorption section for $N_2$—$O_2$ separation. For example, pretreatment of hydrocarbon streams for removal of water and $CO_2$ prior to liquefaction of such streams is disclosed in U.S. Pat. No. 3,841,058. The water (plus methanol) and the $CO_2$ respectively are removed from the feed in separate consecutive adsorbent beds. The water-laden bed is thermally regenerated and the $CO_2$-laden bed is regenerated by pressure reduction, with or without some warming.

U.S. Pat. No. 3,594,983 is particularly concerned with the removal of $CO_2$ contained in relatively large amounts in a natural gas stream which also contains relatively small amounts of water and $H_2S$. Three adsorbent columns are employed which operate in parallel. Regeneration is effected by pressure swing carried out in alternating short interval sequence in two of the columns for removal of adsorbed $CO_2$. After a number of repeated thermal regeneration cycles previously undergone by the third column, that column is subjected to thermal desorption of the more strongly sorbed water therefrom.

The purification of air withdrawn from a closed compartment and the return of the purified air to that compartment is exemplified in U.S. Pat. Nos. 3,221,477; 3,242,651; and 3,738,084. Here again, separate beds are used for removal of the moisture and $CO_2$ respectively from the feed air. The purified gas may be heated and passed through the moisture-laden bed to regenerate that bed and restore moisture to the purified gas returned to the compartment. The $CO_2$-laden bed may be regenerated during a separate independent time interval. In U.S. Pat. No. 3,738,084, regeneration is carried out employing both pressure reduction and heating of selected beds.

SUMMARY OF THE INVENTION

In accordance with the present invention, the feed air is passed through two separate beds of adsorbent. In the first of the beds, water is removed, and in the second bed $CO_2$ is removed. The first bed is operated in the pressure swing adsorption (PSA) mode employing a relatively short operating cycle, while the second bed is operated in the temperature swing adsorption (TSA) mode using a considerably longer time cycle.

In the preferred practice of the invention the feed gas is initially introduced into the first bed at near ambient temperature, thus avoiding need for utilization of the energy that would otherwise be required for pre-chilling the gas as practiced in conventional TSA systems. A further costs saving is afforded by the present invention because of the reduced heat requirement for thermal regeneration of only the $CO_2$-laden bed, as opposed to that required for removal of both adsorbed water and $CO_2$ from the beds.

BRIEF DESCRIPTION OF THE DRAWINGS

The accompanying single FIGURE of drawing is a schematic flow diagram of a preferred system for practice of the invention.

DETAILED DESCRIPTION

Referring to the drawing, the feed air at ambient temperature and pressure enters the inlet side of compressor 10 by line 11 wherein it is compressed to desired process pressure preferably in the range of 40 to 300 psia (3.0 to 20.0 bars.) The compressed gas is then passed by line 12 to a water condenser knockout drum 13 wherein the gas is cooled to near ambient temperature, say in the range of 60° to 100° F. (15° to 38° C.). As a result of such cooling, partial condensation of moisture initially contained in the feed air may occur, which may be drained from the drum through opened valve 14.

The overhead stream of air from the knockout drum is discharged into line 15, which connects to intake manifold 16, for selective introduction into one of the columns 20A or 20B (which is then on the adsorption stroke of the cycle). Each of these columns 20A and 20B contains a bed of solid adsorbent selective for retention of water.

Assuming that column 20A is then on stream for adsorption of water from the air admitted thereto, flow of the feed gas into that column is effected through opened valve 17 at the inlet. The gas will pass through the bed of adsorbent in column 20A and the water-freed effluent discharged through open valve 18 in line 19. The thus dried exit air (preferably having a water level of less than 1-2 ppm) is passed to the $CO_2$ adsorber column 40A or 40B whichever at the time is on stream for removal of $CO_2$. Thus, assuming column 40A is then on stream, the gas in line 19 is passed into column 40A via connecting lines 22 and 24 and then open valve 25. Columns 40A and 40B each contains a bed of adsorbent selective for retention of $CO_2$. The dry and $CO_2$-free air is discharged from column 40A (preferably containing less than 1 ppm $CO_2$) via line 27 and open valve 28 for desired further treatment or use, such as to be supplied as feed to a cryogenic air plant for recovery of component gases by distillation. A heat exchanger as shown at 30 may be provided in line 29 to smooth out any temperature fluctuations in the air stream.

During the time that column 20A is on the adsorption stroke of the cycle, valves 31 to 34 associated with that column will be closed.

The water-containing air is continued to be admitted into column 20A until the exit gas therefrom (in line 19) reaches the maximum permitted value (preset by design of the time cycle). At that point, the feed introduction is switched to column 20B, passing into and through that column through open valve 35 and the water-freed air leaving the column via line 36 and open valve 37. The dried air from 20B may continue to be admitted into column 40A through a number of alternating cycles of switching of the drying operation between columns 20A and 20B and until switching of the $CO_2$ removal operation from column 40A to column 40B becomes necessary for regeneration of the $CO_2$-laden column. While column 40A is still on stream, the dry gas in line 30 will continue to be passed through open valve 37 into column 40A via open valve 25. During the time that column 40A is receiving dry $CO_2$-containing air, column 40B is going through a regeneration cycle.

Following completion of the adsorption step in column 20A, that column is depressurized to near ambient pressure and in a direction counter to feed air flow. This is accomplished by closing valves 17 and 18 and opening valve 31, permitting the voids gas and desorbed gas to be vented through line 50. Column 20A is then purged at near ambient pressure with a stream of water-free gas in a direction countercurrent to that of initial feed air thereto. During such purging the effluent is also vented via line 50. The water-free purge gas employed in purging 20A (or 20B in turn) may be dry waste nitrogen gas from the air plant admitted through blower 45, or may comprise exit gases from 40A and 40B during regeneration of those columns. Also, gases from both these sources may be employed.

If dry nitrogen from an air separation plant is used, it is admitted to the inlet of blower 45 by a line 51 and discharged into line 52, passing into 20A via then opened valve 53, line 54, open valve 32, and line 19. The purged effluent discharged from 20A is also vented through line 50. If exit gas from 40A is to be employed as purge gas, such gas is passed into line 54 via open valve 33 and connecting line 56. In like manner, if gas from 40B is being utilized, it will be passed into line 56 by means of opened valve 58.

Purging is continued until column 20A is regenerated to a pre-set level. At that point column 20A is pressurized to designed level for renewed adsorption. The pressurizing is accomplished by admitting part of the water-freed compressed air effluent from 20B which is then on the adsorption stroke of the cycle. Thus, part of the dry gas, which still contains $CO_2$, discharged from 20B through open valve 37 is admitted into line 19 through then open valve 18; valves 17, 31 and 32 being closed. When column 20A is brought to feed pressure level, it is ready to repeat the cycle starting with introduction thereto of fresh air feed. At the same time, column 20B which will then have completed the adsorption stroke, is started on its course of regeneration.

The cycle times for operation of the 20A and 20B columns are so arranged that the combined durations of the pressure reduction, purging and pressurization steps matches the duration of the adsorption step in these columns. In this way a continuous feed can be supplied to, and water-freed product stream can be withdrawn from the PSA water-removal section of the process. Typically, this PSA section will be operated in a short cycle time format. The whole cycle will be completed in generally less than half-hour and preferably in less than ten to fifteen minutes.

The function of columns 40A and 40B, which are operated in alternating on-stream sequences, is to remove the $CO_2$ impurities from the water-freed air stream leaving columns 20A and 20B. The 40A and 40B columns may be operated over comparatively long periods of at least several hours before these need to be regenerated, and the regeneration is effected thermally with relatively low energy input requirements.

Each of the columns 40A and 40B remains on its adsorption cycle until the effluent therefrom shows a breakthrough of $CO_2$ (1 ppm) or somewhat short of that point, at which time the feed is switched to the other 40 column which had been previously regenerated. For regeneration of the 40A column, for example, it is first depressurized to near ambient pressure level countercurrent to the direction of the feed. During such depressurizing, the effluent gas from column 40A can be used as purge gas in column 20A or 20B, or to repressurize either of these columns, or the effluent may be vented through valve 60. Following pressure let down, column 20A is heated to an elevated regeneration temperature in the order of say 200°–300° F. (93°–150° C.) by passing hot gas, free of water and $CO_2$, through that column at near ambient pressure. As in the case of the purging step employed in the PSA section, the gas for regeneration of column 40A (or 40B in turn) may be obtained by flowing into the column via line 27 (or line 47 respectively) a portion of waste nitrogen gas from the air-separation plant. Thus, gas to line 27 will flow from blower 45 through open valve 61, line 62, heater 63 and open valve 34. The heating of the gas is continued until a pre-set amount of heat is introduced into column 40A, at which time the heat supply in 63 is switched off, or heater 63 is by-passed, and the purge gas is continued to flow through column 40A for cooling the column to near ambient temperature. The effluent gas during the heating and cooling of column 40A may be used to purge either of vessels 20A or 20B. At the termination of the cooling step, column 40A is brought back to feed pressure level by admission thereinto of a part of the $CO_2$-free compressed effluent from companion column 40B which is then on the adsorption stroke of the cycle. When brought to the required pressure level, column 40A is ready to resume another adsorption stroke while at the same time column 40B starts on its regeneration sequence.

The cycle times for operation of columns 40A and 40B are so arranged that the combined durations of the pressure reduction, heating, cooling and pressurization steps of one of these columns matches the duration of the adsorption step simultaneously being carried out in the parallel companion column. In this way a continuous air feed can be supplied to the TSA section of the system and a $CO_2$-free product stream can be withdrawn therefrom. While, as above indicated, in the operation of the PSA section the ambient air feed to columns 20A and 20B is alternating at intervals of a designed number of minutes, the TSA section is operated in a long cycle time format, feed of the dried air to the columns 40A and 40B being alternated at intervals of several hours.

It will be evident from the drawings that valves 41, 42, 43 and 44 serve the same function with respect to the vessels 20B and 40B with which these are associated as respectively do the corresponding valves 31, 32, 25, and 28 associated with vessels 20A and 40A in their respective alternating adsorption and regeneration periods. Thus, during admission of fresh air feed from line 15 into column 20B through then opened valve 35, valves 41 and 42 will remain closed. Valve 41 is opened at the completion of the adsorption step in column 20B to permit voids gas and desorbed gas to be vented therefrom through line 50. Purging of column 20B is effected by admission of the purge gas from line 54 through opened valve 42 and line 36. Just as valves 25 and 28 are open for passage of water-freed gas into column 40A when that column is on-stream, the corresponding valves 43 and 44 are opened during the period when column 40B is on stream. During thermal regeneration of column 40B in its turn, the regeneration gas from heater 63 is introduced into line 47 through opened valve 48.

Any adsorbent selective towards water adsorption can be employed for the PSA section of the processing system. Typical examples are alumina, silica gel and molecular sieves such as 5A and 13X aluminosilicates. The TSA section must employ an adsorbent selective towards very dilute $CO_2$; 5A and 13X molecular sieves being preferred for this purpose.

Table 1 below tabulates a preferred example of cycle time intervals for a PSA section, based on a selected four minute cycle.

TABLE 1
CYCLE TIME FOR PSA SECTION

| Seconds | Column 20A | Column 20B |
|---|---|---|
| 0–15 | Adsorption | Depressurization |
| 15–105 | Adsorption | Purging |
| 105–120 | Adsorption | Pressurization |
| 120–135 | Depressurization | Adsorption |
| 135–225 | Purging | Adsorption |
| 225–240 | Pressurization | Adsorption |

In Table 2 below a preferred example of the cycle time intervals of the TSA section is set out, based on an 8 hour operating cycle. Longer or shorter cycle times can, of course, be employed, depending upon relative bed size and adsorbent capacity.

TABLE 2
CYCLE TIME FOR TSA SECTION

| Minutes | Column 40A | Column 40B |
|---|---|---|
| 0–5 | Adsorption | Depressurization |
| 5–120 | Adsorption | Heating |
| 120–235 | Adsorption | Cooling |
| 235–240 | Adsorption | Pressurization |
| 240–245 | Depressurization | Adsorption |
| 245–360 | Heating | Adsorption |
| 360–475 | Cooling | Adsorption |
| 475–480 | Pressurization | Adsorption |

The energy savings obtained by the operation in accordance with the present invention will be appreciated from the comparison in Table 3 below of the energy requirements for $CO_2$ and water removal in a typical conventional plant of equal throughput capacity wherein the molecular sieve for removal of water and $CO_2$ from feed air is thermally regenerated. The reported energy requirements are based on atmospheric feed air at 100° F. and 100 psia, saturated with $H_2O$, and containing 350 ppm $CO_2$.

TABLE 3

| | Energy requirements in BTU/hr $\times 10^{-6}$ | |
|---|---|---|
| | Conventional | Present Invention |
| Main chiller | 0.12 | — |
| Blower | 0.09 | 0.15 |
| Regeneration heater | 0.40 | 0.16 |
| Totals | 0.61 | 0.31 |

Accordingly, it will be apparent that the present invention is capable of achieving an energy reduction in the order of 50% of that previously required in the typical prior art type of cycle.

What is claimed:
1. The process of removing water and $CO_2$ from an air feed stream containing the same, which comprises the steps of:
introducing the air stream at superatmospheric pressure into a first bed of solid adsorbent effective in adsorption of water from said feed air stream,
discharging the dried air from the first bed and introducing a major portion thereof into an initial sec- ond bed containing adsorbent effective in retention of $CO_2$, collecting the clean dry air thus obtained as product gas;

regenerating said first bed after a relatively short on-stream operating period and, during said regenerating of said first bed, introducing the air feed stream into a companion parallel bed of similar composition as said first bed and operated in alternating sequence therewith, the regeneration of said first bed being effected by the sequential steps of:

(a) reducing the pressure at the air feed inlet of the bed thus venting at least voids gas from the bed, (b) purging the bed at the reduced pressure with a dry gas, and (c) introducing dried air discharged from said companion bed into the purged bed to bring said bed to initial superatmospheric pressure for further adsorption of water;

said alternating introduction of feed air into said first bed and said companion bed being continued for a relatively long period while continuing to discharge dried air from said first bed and said companion bed each in turn to said initial second bed;

independently regenerating said initial second bed after said relatively long on-stream period by the sequential steps of (d) depressurizing the $CO_2$-laden bed by venting therefrom a gas effluent including voids gas, (e) elevating the temperature of the bed to drive off adsorbed $CO_2$, (f) introducing cool gas into the bed to restore the same to near ambient temperature, and (g) bringing the cooled bed to its initial adsorption pressure level by introduction of dry $CO_2$-free product gas.

2. The process as defined in claim 1 wherein the regeneration of said first bed is carried out after on-stream adsorption of water for not more than fifteen minutes, and said second bed continues adsorption of $CO_2$ for at least several hours before being subjected to regeneration.

3. The process as defined in claim 1 wherein the air is introduced into said first bed at near ambient temperature.

4. The process as defined in claim 3 wherein the feed air is introduced into said first bed at an absolute pressure of 40 to 300 pounds per square inch.

5. The process as defined in claim 1 wherein the dry, $CO_2$-free product air obtained, is subjected to separation of oxygen and nitrogen therein by cryogenic distillation and the obtained nitrogen from said cryogenic distillation is employed as purge gas in step (b).

6. The process as defined in claim 5 wherein nitrogen gas from said cryogenic distillation is employed after heating said gas for elevating the temperature of the second bed during step (e).

7. The process as defined in claim 5 wherein nitrogen gas from said cryogenic distillation is employed for cooling the second bed in step (f).

8. The process as defined in claim 1 wherein said purging in step (b) is effected with a gas stream comprising, at least in part, effluent gas discharged from the second bed during regeneration of such second bed, said gas being flowed through said first bed in a direction counter to initial feed air flow therein.

9. The process as defined in claim 1 wherein introduction of feed air into said first bed and into said companion parallel bed is switched alternately at time periods of less than every 10 minutes.

10. The process as defined in claim 1 wherein during the period of regeneration of said second bed, dried air effluent from the first bed and from its parallel companion bed in alternate turns is introduced into another $CO_2$-adsorbent bed operated in parallel to said second bed and similar in composition to that of said second bed.

11. The method as defined in claim 10 wherein during depressuring of said second bed in step (d), at least part of the effluent gas is employed as purge gas in a first bed undergoing step (b).

12. The method as defined in claim 10 wherein during depressuring of said second bed in step (d) at least part of the effluent is employed in pressuring a first bed undergoing step (c).

13. The method as defined in claim 10 wherein said second bed is brought to its initial adsorption pressure level in step (g) by admission into said bed of compressed $CO_2$-free effluent from another $CO_2$-adsorbent bed operated in parallel to said second bed.

14. The method as defined in claim 10 wherein said second bed continues to receive dried air effluent alternately from the first bed and from the parallel companion to the first bed during a period of at least several hours before said second bed is subjected to regeneration.

* * * * *